(12) United States Patent
Silverstein et al.

(10) Patent No.: US 8,366,281 B2
(45) Date of Patent: Feb. 5, 2013

(54) OUT-OF-PLANE MOTION OF SPECKLE REDUCTION ELEMENT

(75) Inventors: Barry D. Silverstein, Rochester, NY (US); Gary E. Nothhard, Hilton, NY (US); Joseph R. Bietry, Rochester, NY (US); Robert Metzger, Fairport, NY (US); Andrew F. Kurtz, Macedon, NY (US)

(73) Assignee: Eastman Kodak Company, Rochester, NY (US)

( * ) Notice: Subject to any disclaimer, the term of this patent is extended or adjusted under 35 U.S.C. 154(b) by 288 days.

(21) Appl. No.: 12/469,766

(22) Filed: May 21, 2009

(65) Prior Publication Data

US 2010/0296065 A1 Nov. 25, 2010

(51) Int. Cl.
*G03B 21/14* (2006.01)
(52) U.S. Cl. ........................................ 353/101; 359/599
(58) Field of Classification Search .................. 353/101, 353/38, 69, 37; 357/375; 359/375, 599
See application file for complete search history.

(56) References Cited

U.S. PATENT DOCUMENTS

| | | | |
|---|---|---|---|
| 4,035,068 A | 7/1977 | Rawson | |
| 5,597,222 A * | 1/1997 | Doany et al. | 353/33 |
| 6,094,181 A * | 7/2000 | Hildebrand et al. | 345/8 |
| 6,747,781 B2 | 6/2004 | Trisnadi | |
| 6,808,269 B2 | 10/2004 | Cobb | |
| 6,869,185 B2 * | 3/2005 | Kaminsky et al. | 353/31 |
| 7,057,830 B2 * | 6/2006 | Ebbesmeier | 359/755 |
| 2002/0093737 A1 * | 7/2002 | Itoh et al. | 359/487 |
| 2003/0133079 A1 | 7/2003 | Cobb | |
| 2004/0008392 A1 | 1/2004 | Kappel et al. | |

(Continued)

FOREIGN PATENT DOCUMENTS

| | | |
|---|---|---|
| EP | 1 292 134 A2 | 3/2003 |
| EP | 1 536 263 A1 | 6/2005 |

(Continued)

OTHER PUBLICATIONS

Kenichi, Kasazumi, Yasuo Kitaoka, Kiminori Mizuuchi, Kazuhisa Yamamoto: "A Practical Laser Projection With New Illumination Optics for Reduction of Speckle Noise", Japanese Journal of Applied Physics, vol. 43, No. 8B, Aug. 25, 2004, pp. 5904-5906, XP002598033, p. 5905, left-hand col.; figures 1,5.

(Continued)

*Primary Examiner* — Georgia Y Epps
*Assistant Examiner* — Jerry Brooks
(74) *Attorney, Agent, or Firm* — Kevin E. Spaulding

(57) ABSTRACT

In a coherent light projection system including an image forming system, a relay system, a speckle reduction element, and a projection subsystem, the relay system can have a first f-number, and the projection subsystem can have a second f-number less than the first f-number. The relay system can have a first working distance, and the projection subsystem can have a second working distance less than the first working distance. The image forming system can project an initial image having a first size, and an intermediate image can have a second size greater than or equal to the first size. The speckle reduction element can have a curved surface through which the intermediate image is transferred. The speckle reduction element can include a lenslet arrangement formed on a surface thereof. The speckle reduction element can be moved in a direction parallel to an optical axis of the speckle reduction element.

21 Claims, 8 Drawing Sheets

U.S. PATENT DOCUMENTS

| | | | |
|---|---|---|---|
| 2006/0033009 A1 | 2/2006 | Kobayashi et al. | |
| 2007/0273849 A1* | 11/2007 | Takeda | 353/122 |
| 2008/0198334 A1 | 8/2008 | Kasazumi et al. | |
| 2009/0040467 A1* | 2/2009 | Yamauchi et al. | 353/38 |
| 2009/0161196 A1* | 6/2009 | Malfait | 359/290 |

FOREIGN PATENT DOCUMENTS

| | | |
|---|---|---|
| EP | 2 194 722 A1 | 6/2010 |
| EP | 2 196 844 A1 | 6/2010 |
| JP | 2008 134269 A | 6/2008 |
| JP | 2008 224760 A | 9/2008 |
| WO | WO 2006/095855 A1 | 9/2006 |

OTHER PUBLICATIONS

Seungdo An, Anatoliy Lapchuk et al: "Speckle Suppression in Laser Display Using Several Partially Coherent Beams", Optics Express, vol. 17, No. 1, Jan. 5, 2009, pp. 92-103, XP-002614508, p. 94-p. 95; Figures 1, 2.

Peter Janssens, Koen Malfait: "Future Prospects of High-End Laser Projectors", SPIE Proceedings Photonics West 2009 (7232), vol. 7232, Feb. 3, 2009, pp. 1-12, XP002614509, Paragraph [04.1].

Goodman, Joseph W., "Speckle Phenomena in Optics Theory and Application", 2007, pp. 203-223.

* cited by examiner

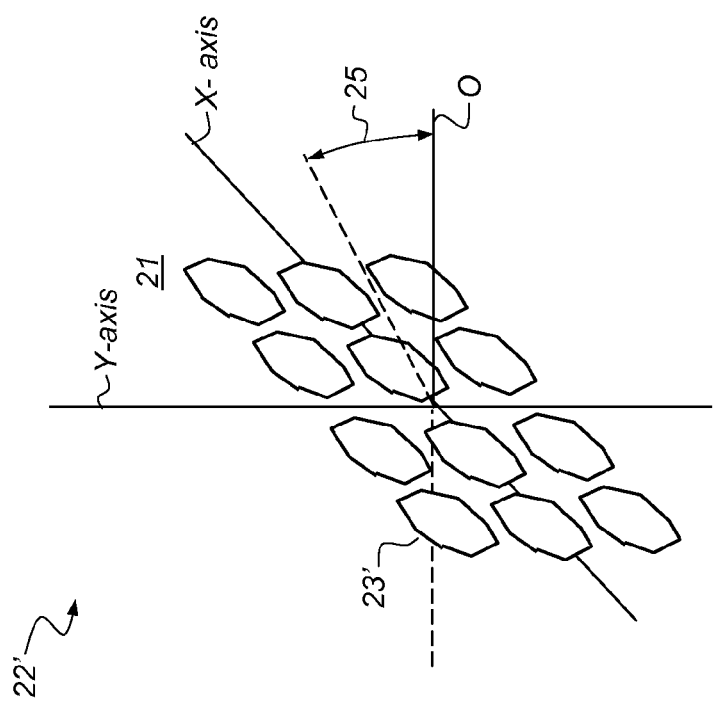
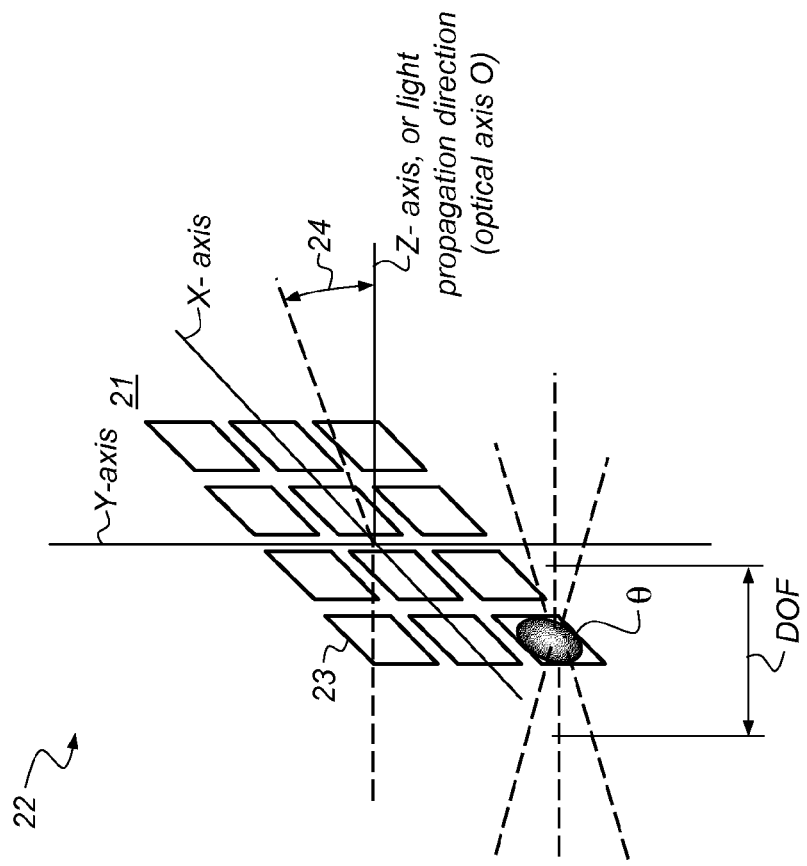
FIG. 5b
FIG. 5a

OUT-OF-PLANE MOTION OF SPECKLE REDUCTION ELEMENT

CROSS-REFERENCE TO RELATED APPLICATIONS

This application is filed concurrently with and has related subject matter to:

U.S. patent application Ser. No. 12/469,318, titled "Projection with Slow Relay and Fast Projection Subsystems", with Barry Silverstein as the first named inventor;

U.S. patent application Ser. No. 12/469,727, titled "Projection with Curved Speckle Reduction Element Surface", with Barry Silverstein as the first named inventor;

U.S. patent application Ser. No. 12/469,737, titled "Projection with Larger Intermediate Image", with Joseph R. Bietry as the first named inventor; and U.S. patent application Ser. No. 12/469,751, titled "Projection with Lenslet Arrangement on Speckle Reduction Element", with Barry Silverstein as the first named inventor, each of which is incorporated herein by reference in its entirety.

FIELD OF THE INVENTION

The present invention relates generally to digital image projection and more particularly to a coherent light projection system providing speckle compensation.

BACKGROUND OF THE INVENTION

Conventional projection lenses used for projecting an image onto a display surface are designed with relatively fast optics. This is particularly true for cinema projection, where traditional film projection lenses may be as fast as ~f/1.8, and in the emerging technology of digital cinema, lenses are often ~f/2.5. These low f/# values and correspondingly high angular light are due, in large part, to the large etendue light sources that are used, such as various types of very bright arc lamps and similar light sources, along with the desire to utilize as much of this light as possible.

In the case of digital cinema projection, the image content is provided via pixelated spatial light modulators, such as LCD and LCOS modulators, Digital Micromirror Devices (DMDs), and in particular, the DLP (Digital Light Processor) from Texas Instruments, Inc., Dallas, Tex. Individual pixels of these electronic light modulation devices are modulated on a pixel-addressed basis to impart image data to a transiting light beam. To enable cinema projection, large versions of the devices, with active areas of ~400-600 $mm^2$ are used, to be compatible and light efficient when used with the large-etendue xenon lamp light sources used for cinema projection. However, we have determined that these large-etendue light sources impact the projector design in various disadvantageous ways, including size and cost of the optical components, thermal load and stress on these components, and the optical imaging performance and image quality provided by the optics. For example, the highly angular light incident transiting the spatial light modulator device, and its associated polarization optics, unfavorably impact the projected image quality, with peak contrast and contrast uniformity deficiencies.

In greater detail, the illumination and projection subsystems of digital projection systems are typically more complex than their equivalents in traditional film-based systems. In particular, in the digital systems, the projection lens systems are often burdened with different and additional requirements compared to the conventional projection optics. As one example, the projection lenses for the digital systems are typically required to provide a long back focal length or working distance, that is, the distance between the last lens surface and the spatial light modulator. Working distances in excess of 2 times the lens focal length are needed in most cases, in order to accommodate a number of optical components used to combine modulated light from the different color paths onto a common optical axis and, depending on the type of spatial light modulator used, to provide polarization, filtering, and other conditioning and guiding of the light. Taken together, the long back focal length and speed requirements (low F#) combine to drive complex lens designs using large elements, as can be well appreciated by those skilled in the optical design arts. As a result, projection lenses used for large venue or digital cinema projection systems are quite expensive, particularly when compared to conventional projection lenses, such as those used in film-based projectors.

As one attempt to reduce this magnitude of this problem, a system, as described in commonly assigned U.S. Pat. No. 6,808,269 entitled "Projection Apparatus Using Spatial Light Modulator" to Cobb, uses imaging relay lenses. Each modulator is imaged by a relay lens to create a real aerial magnified intermediate image near the exit face of a combiner prism. The large numerical aperture (NA) at the modulator plane is reduced, for example by two times, increasing the F# by a corresponding two times. The three-color images are combined through a prism, and then imaged by a common projection lens to the screen. Although the overall system, with the three imaging relays, is increased in complexity, that increased complexity and cost is more than compensated for by the simplicity of the projection lens, which works at a larger F#, without the working distance requirements.

As another approach, the use of visible lasers, having an advantageously small etendue as compared with conventional light sources, offers an opportunity to provide simplified system optics, for example, by enabling projection lenses having similar levels of modest complexity as do the lenses used for film-based projection. In recent years, visible laser light sources have improved in cost, complexity, and performance, thereby becoming more viable for use in projection, including for cinema. Lasers may provide a range of advantages for image projection, including an expanded color gamut, but their small etendue is particularly advantageous for digital systems based on LCDs, DLP, and other types of light modulators, smaller, slower, and cheaper lens elements, with values in the f/8 range or slower may be used, while still providing light of sufficient visible flux for the cinema application, as well as other projection applications. It is noted that lasers also enable other modulator types to be used for projection, such as the Grating Electromechanical (GEMS) modulators, which are linear array devices that utilize diffraction to generate the image data, and which require a small etendue.

Lasers provide many potential substantial advantages for projection systems, including a greatly expanded color gamut, potentially long life sources, and simplified optical designs. However, lasers also introduce speckle, which occurs as result of the coherent interference of localized reflections from the scattering surface of the display screen. Speckle is a high contrast granular noise source that significantly degrades image quality. It is known in the imaging arts that speckle can be reduced in a number of ways, such as by superimposing a number of uncorrelated speckle patterns, or using variations in frequency or polarization. Many of these methods are disclosed in "Speckle Phenomena in Optics: Theory and Applications" by Joseph W. Goodman. As one example of a speckle reduction method pertaining to projection, the display screen is rapidly moved with oscillating motion, generally following a small circle or ellipse about the optical axis. As the screen moves, speckle changes, as localized interactions of the laser light with scattering features are altered by the screen motion. When this oscillating motion is sufficiently fast, speckle visibility is reduced by temporal and spatial averaging, and speckle can become imperceptible to the viewers. Yet another strategy for speckle reduction is to place an optical diffuser at an intermediate image plane internal to the projector, and prior to the projection lens. Oscillation of the diffuser then has the effect of reducing viewer perception of speckle.

A variety of optical diffusers have been used for laser projection speckle reduction, including ground glass, volume, holographic, and lenslet based devices. As one example, in the apparatus disclosed in U.S. Pat. No. 6,747,781 entitled "Method, Apparatus, and Diffuser for Reducing Laser Speckle" to Trisnadi, which uses a diffuser patterned as a Hadamard matrix, in conjunction with a diffractive linear array modulator (GLV) to provide temporal phase variation to an intermediate image of a scanned line of modulated light. This diffuser is constructed of an array of diffusing phase cells, each of which is subdivided into N cell partitions, whose pattern is determined by the Hadamard matrix calculations. An exemplary cell can be 24 μm square and comprise N=64 cell partitions that are 3 μm square. The cell partitions either are an area of the base surface, or a raised, mesa-like area, pi ($\pi$) high. If the temporal phase variation provide by the diffuser motion and the cell patterning are appropriate, phase variations in the transiting laser beams are decorrelated, enabling speckle reduction. Specially designed projection and scanning optics are then required in order to project each conditioned line of light onto the display screen. Typically, the projection lens used for such a line-scanned device has an f/# of 2.5. While Trisnadi provides effective reduction of projected speckle, speckle reduction is only one aspect of the design of a laser projection system. Speckle reduction provided by a moving diffuser located at an internal intermediate image plane, that is then imaged to a screen, introduces various further problems, including a reduction image quality (resolution or MTF), light loss from diffusion (scatter or diffraction), and a requirement for faster imaging optics to collect diffused light.

Although many speckle reduction techniques, such as these, exist, there is a continuing need in the art for improved techniques that reduce speckle perception for projected images, while also enabling advantaged designs and system performance from laser projection systems.

SUMMARY

The above-described problems are addressed and a technical solution is achieved in the art by a system and a method for coherent light projection, according to various embodiments of the present invention. In embodiments of the present invention, a coherent light source system emits coherent light. An image forming system interacts with the coherent light in a manner consistent with image data. A relay system forms an intermediate image at an intermediate image plane from coherent light output from the image forming system. The intermediate image is an aerial real image. A speckle reduction element is located at or substantially at the intermediate image plane. A movement generating system moves the speckle reduction element, and a projection subsystem projects the intermediate image, as transferred or passed through the speckle reduction element.

In some embodiments of the present invention, the relay system has a first f-number, and the projection subsystem has a second f-number less than the first f-number. In some of these embodiments, the second f-number is at least half the first f-number. For example, the first f-number can be f/6 or greater, and the second f-number can be f/3 or smaller.

In some embodiments of the present invention, the relay system has a first working distance, and the projection subsystem has a second working distance less than the first working distance. In some of these embodiments, the second working distance is at least half the first working distance. For example, the first working distance can be 100 mm or greater, and the second working distance can be 50 mm or smaller.

In some embodiments of the present invention, the image forming system projects an initial image having a first size, and the intermediate image has a second size greater than or equal to the first size at the intermediate image plane. In some of these embodiments, the second size is consistent with a 16 mm, 35 mm, or 70 mm film format. Also in some of these embodiments, the projection subsystem corrects for film buckle effects.

In some embodiments of the present invention, the speckle reduction element has a curved surface through which the intermediate image is transferred. In some of these embodiments, the projection subsystem corrects for film buckle effects, and the curved surface compensates for the projection subsystem's correction of the film buckle effects. The curved surface can be a surface through which the intermediate image is received by the speckle reduction element or through which the intermediate image exits the speckle reduction element. The curved surface of the speckle reduction element can be an etched or polished surface, and it can include randomly or substantially randomly distributed surface structures, such as lenslets.

In some embodiments of the present invention, the speckle reduction element includes a lenslet arrangement formed on a surface of the speckle reduction element, the lenslet arrangement including lenslets each having an aperture. Each of all or substantially all of the lenslet apertures is greater than or equal to a size of a pixel of the intermediate image at the intermediate image plane. The lenslet arrangement can have a random or substantially random distribution of lenslets. The lenslets can be in or substantially in a hexagonal, linear, or diagonal pattern. And, the lenslets can be abutting or non-abutting. If they are non-abutting, a spacing between the lenslets can be or substantially be large enough to allow a diffusion from the spacing to pass into an acceptance aperture of the projection lens. The spacing between the lenslets can be greater than or equal to a size of a pixel of the intermediate image at the intermediate image plane. In some embodiments, the movement-generating system moves the speckle reduction element in-plane a distance that is greater than or equal to a period of lenslet repetition. In some embodiments, an acceptance aperture of a lens in the projection subsystem captures diffusion caused by spacings between the lenslets or valleys between abutting lenslets. In some embodiments, an acceptance aperture of a lens in the projection subsystem captures a fourth order energy or below of the reduced-speckle image. In some embodiments, the lenslet arrangement passes a fourth order energy or lower of the reduced-speckle image into an acceptance aperture of the projection subsystem.

In some embodiments of the present invention, the movement-generating system causes motion of the speckle reduction element in a direction parallel to an optical axis of the speckle reduction element. In some of these embodiments, the motion is within a depth of focus of the projection subsystem. Also in some of these embodiments, the motion is within a depth of focus of the relay system. The motion can further include motion in a direction perpendicular to the optical axis of the speckle reduction element.

Various embodiments of the present invention are particularly well-suited for spatial light modulators such as DLP devices that modulate light from a laser or other high brightness light source with coherence. Various embodiments of the present invention provide an optical system that allows the use of conventional type projection lens elements and takes advantage of high brightness that can be obtained using laser light.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

The present invention will be more readily understood from the detailed description of exemplary embodiments presented below considered in conjunction with the attached drawings, of which:

FIGS. 5a and 5b illustrate internal system images, including an intermediate image and a diffused image, respectively;

DETAILED DESCRIPTION

For the detailed description that follows, it is to be understood that elements not specifically shown or described may take various forms well known to those skilled in the art. Figures shown and described herein are provided to illustrate principles of operation and component relationships along their respective optical paths according to embodiments of the present invention and may not show actual size or scale. Some exaggeration may be necessary in order to emphasize basic structural relationships or principles of operation. In some cases, components that normally lie in the optical path of the projection apparatus are not shown, in order to describe the operation of projection optics more clearly.

The invention is inclusive of combinations of the embodiments described herein. References to a particular embodiment and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular and/or plural in referring to the "method" or "methods" and the like is not limiting.

The term "f-number" or f/# as used in the present disclosure has its conventional meaning as the ratio of focal length to acceptance aperture diameter. Further, unless otherwise explicitly noted or required by context, the word "or" is used in this disclosure in a non-exclusive sense.

Figure 1:
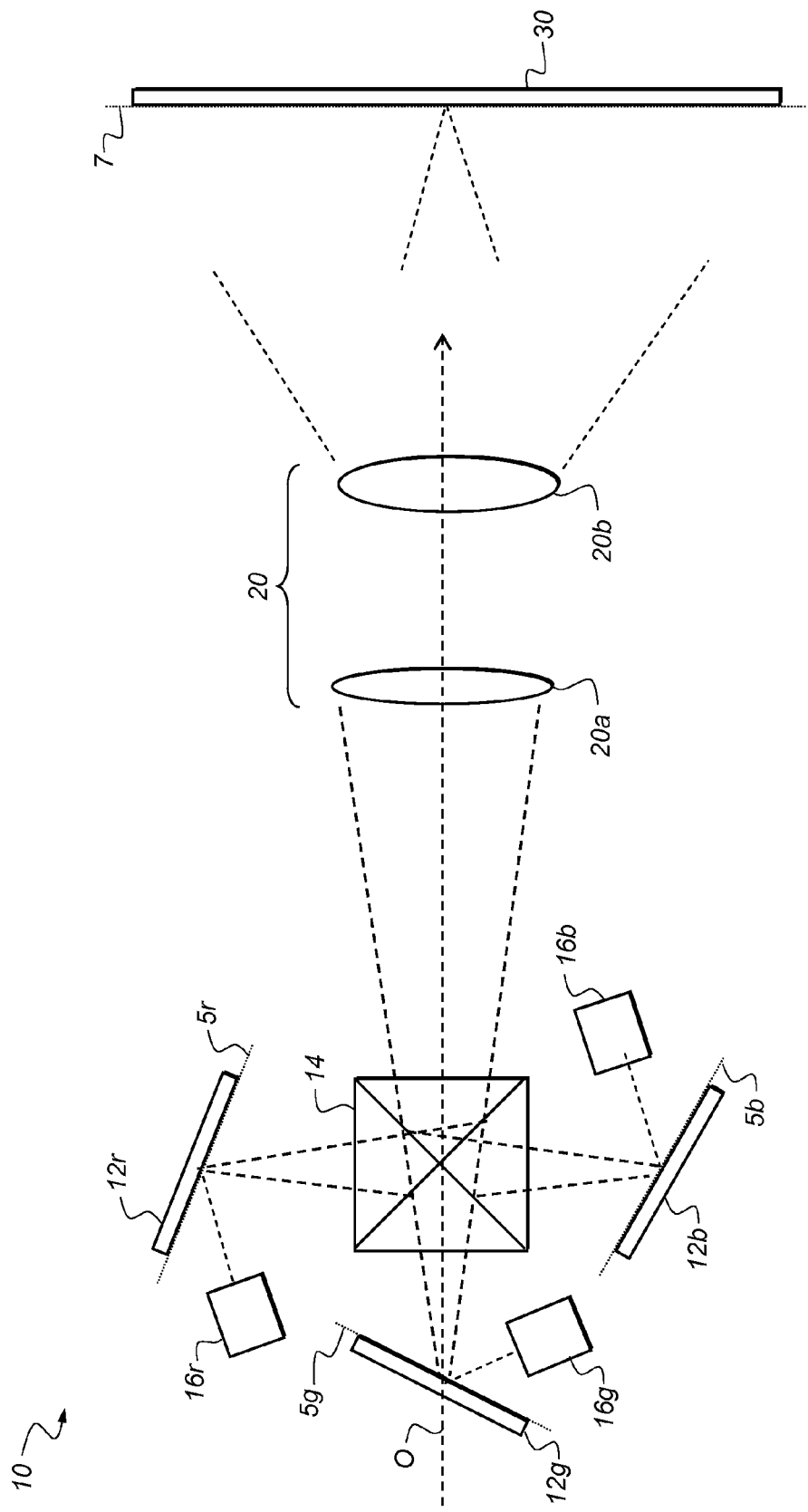
FIG. 1 is a diagram showing some common components used in embodiments of the present invention.

FIG. 1 illustrates a simplified schematic of several common coherent light projection system components used in various embodiments of the present invention. Later figures and the following description introduce additional components that are added to the common components illustrated in FIG. 1. In this regard, FIG. 1 shows a coherent light projection system 10 with a coherent light source system that emits highly coherent light. In the case of FIG. 1, the coherent light system includes a coherent light source 16r, 16g, and 16b for each of red, green, and blue color channels, respectively. However, other color channels may be used. Also in the case of FIG. 1, the coherent light sources 16r, 16g, 16b are laser light sources, such as direct emission diode laser arrays, fiber lasers, or IR pumped, harmonic conversion lasers. However, any coherent or partially coherent light source with sufficient brightness and beam qualities can be used. For example, visible wavelength super luminescent diodes (SLEDs) may be used.

Light emitted from the coherent light sources 16r, 16g, 16b is received by an image forming system, which, in the case of FIG. 1, includes spatial light modulators 12r, 12g, 12b (such as DLP (digital micromirror) devices) and a combining element (such as a dichroic combiner 14). Each light modulator 12r, 12g, 12b lies at an object plane 5r, 5g, 5b, respectively, of a projection system, in this case, an imaging lens 20a of a projection subsystem 20. In addition, each spatial light modulator 12r, 12g, 12b is image conjugate to a displayed image plane 7, at display surface 30, where a screen can be located. This arrangement can be used for an LCD or other type of light modulator.

During operation of the coherent light projection system 10, the light modulators 12r, 12g, 12b interact with the coherent light emitted from the light sources 16r, 16g, 16b, in a manner consistent with image data, such as image data representing an image frame in a movie. In this regard, control signals are provided to the light modulators 12r, 12g, 12b by a data processing system (not shown), such as a control system, that controls the light modulators 12r, 12g, 12b in the manner consistent with image data using techniques and equipment known in the art. In particular, the light modulators 12 comprise two-dimensional arrays of addressable modulator pixels (not shown) that modulate incident light in accordance with the image data signals. Light modulation can be provided by a variety of means, including redirection by tilting of micro-mirrors (DLP), polarization rotation (LCOS or LCD), light scattering, absorption, or diffraction.

The modulated light from the light modulators 12r, 12g, 12b is combined onto the same optical path, axis O, at the dichroic combiner 14. Light combined by the combiner 14 ultimately reaches the projection subsystem 20 including, in this case, an illustrative pair of lenses 20a, 20b, which project images of the image content on the display surface 30.

Some of the problems that face the optical systems designer can be better appreciated by considering the simplified schematic diagram of FIG. 1. In the system 10, a long working distance is needed, as light from multiple light modulators 12r, 12g, 12b is combined via combiner 14 before being projected to the display surface 30 by the projection subsystem 20. Also, it can be advantageous to have projection subsystem 20 operate at a large f# (such as f/6 or higher) in object space, so that the long working distance is more readily and inexpensively achieved. Additionally, by not capturing the light at large angles, the projection subsystem 20 would not pick up as much unwanted stray light that can be scattered from nearby surface structures. For example, components such as MEMS devices (such as the DLP modulators), lens element edges and defects, and other structures can scatter light within the imaging system. This scattered light, or flare light, can pass through the lens to the screen and reduce both wide area image contrast (ANSI contrast) and localized or image detail contrast, thereby affecting the apparent screen blackness and resolvable detail. On the other hand, to reduce speckle visibility from a coherent source projection subsystem 20, it would be preferable to deliver convergent light to the display surface 30 with a large angular width (large numerical aperture ("NA")). However, assuming a constant magnification from the projection subsystem 20, this means that the angular width of the light on the modulator side is also large, for example, having a low f# (e.g., f/3 or lower). Thus, the desire to reduce potential speckle visibility is in conflict with the needs to reduce lens complexity and cost and minimize collection of internally scattered light.

Figure 2:
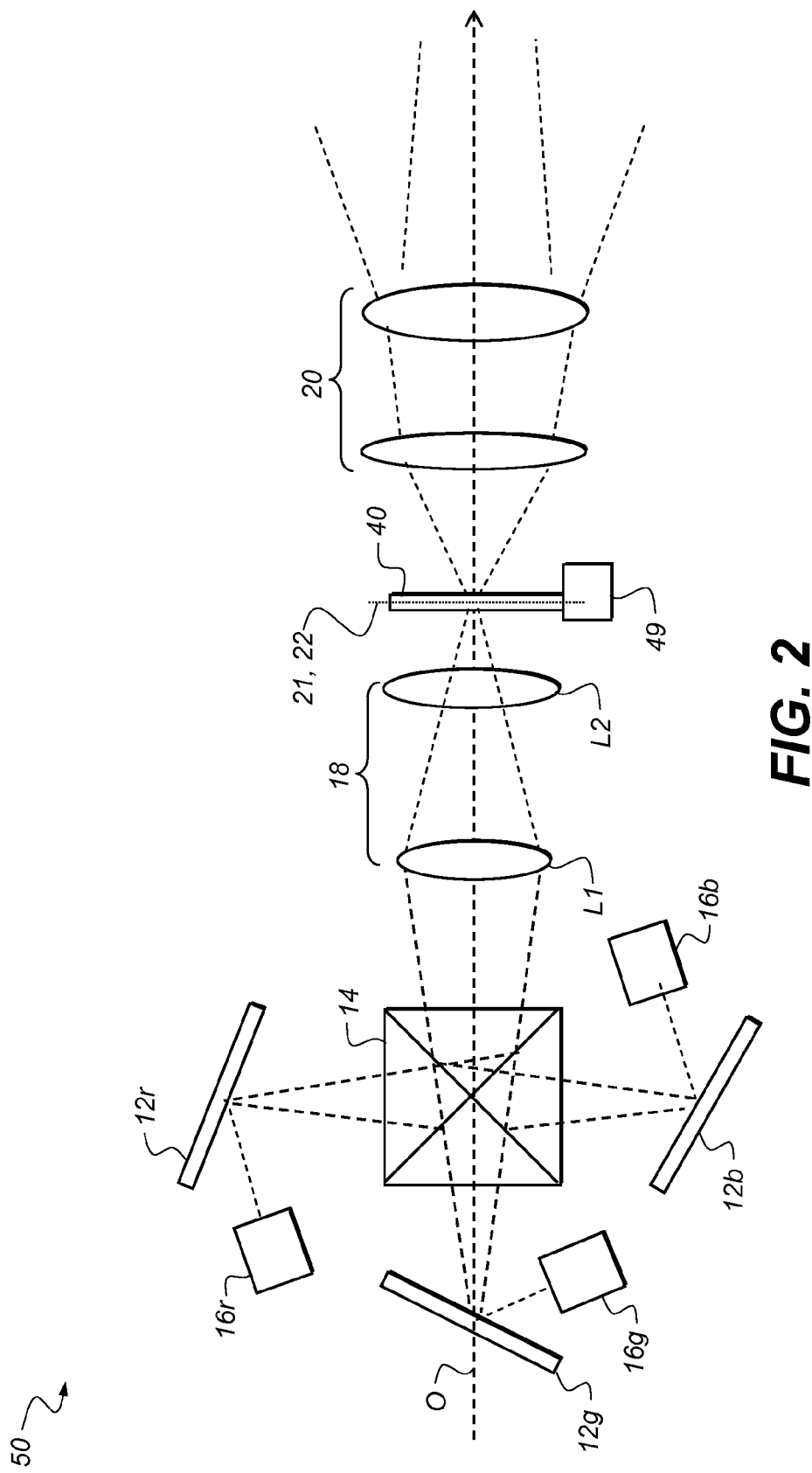
FIG. 2 is a diagram showing an apparatus of an embodiment of the present invention for digital image projection with reduced speckle.

The schematic block diagram of FIG. 2 shows a coherent light projection system 50, according to an embodiment of the present invention that alters the basic design of FIG. 1 in order to reduce speckle visibility. In particular, the light passing through combiner 14 is directed through a relay system, in this case, a relay lens 18. Relay lens 18, comprising at least one relay lens element L1, is positioned to have each light modulator 12r, 12g, and 12b as objects that are image conjugate to an intermediate image 22 formed at an intermediate image plane 21. The intermediate image 22 is an aerial real image formed by the relay system (e.g., relay lens L1) and other upstream optics at the intermediate image plane 21. An aerial real image is an image located in space that could be viewed if a screen or other display structure were placed at the corresponding image plane, in this case, intermediate image plane 21. In this instance, the aerial intermediate image 22 shown in FIG. 5a comprises an array of intermediate image pixels 23 that are pixel images of the modulator pixels. In particular, the intermediate image pixels 23 comprise overlapped and aligned images of corresponding pixel images from the red, green and blue modulators (12r, 12g, 12b). Preferably, the corresponding imaged modulator pixels are co-aligned to within ¼ pixel error or better across the entire intermediate image 22 at intermediate image plane 21. The intermediate image plane 21 is located within or substantially within a speckle reduction system, which, in this case, comprises a speckle reduction element 40 and a movement generating system, in this case, an actuator 49, that moves the speckle reduction element 40. The intermediate image 22, as transferred or passed through the speckle reduction element 40, is projected by the projection subsystem 20. The Relay lens 18 has a relatively long working distance Wa (see FIG. 3) on the order of 150 mm and is a relatively slow lens, around f/6. In some embodiments, relay lens 18 is telecentric on the side facing the light modulators 12.

Figure 3:
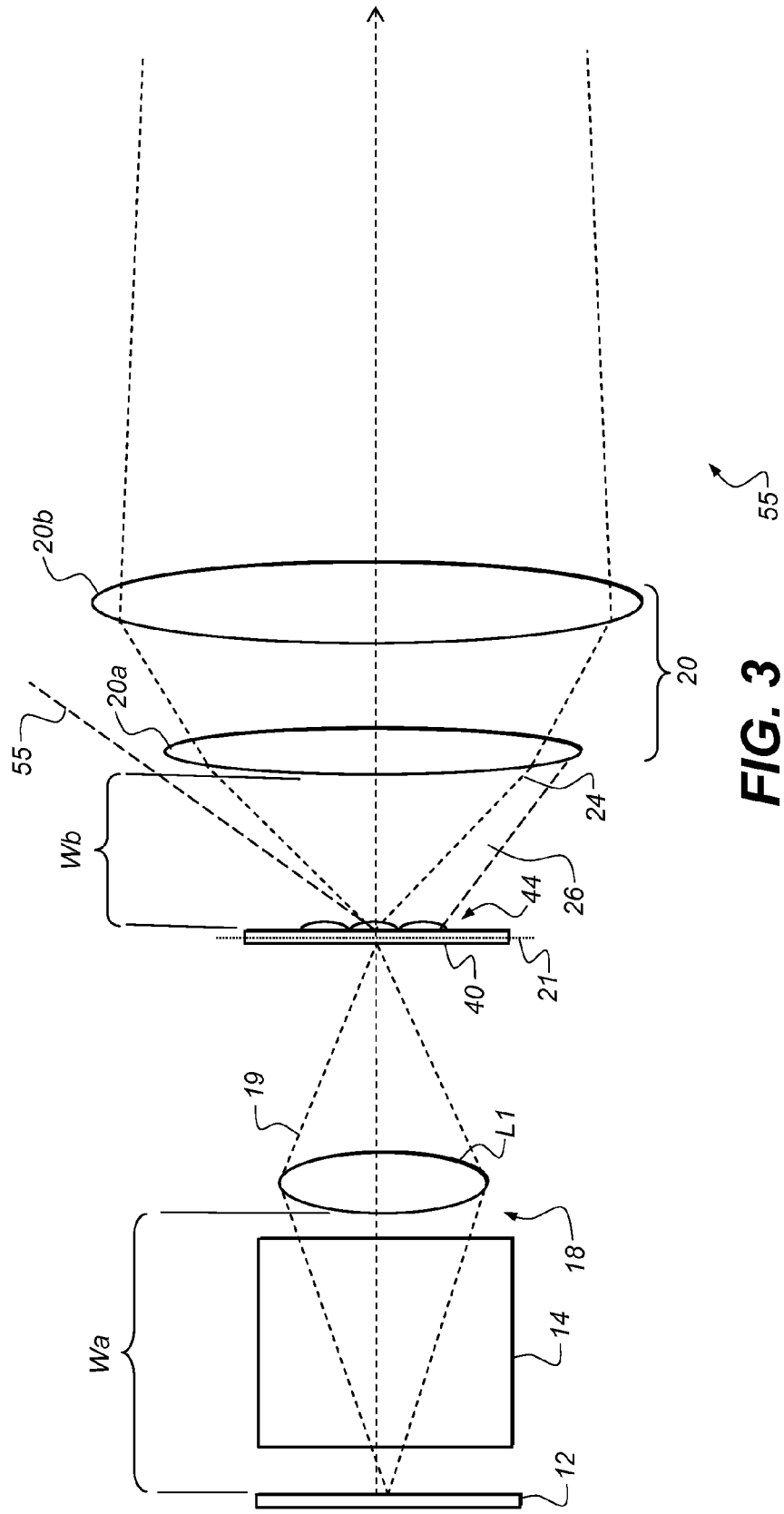
FIG. 3 is a diagram showing an apparatus of an embodiment of the present invention with approximate f# and acceptance aperture relationships.

FIG. 3 shows an embodiment where the relay lens 18 has an f# (i.e., first f# 19 in FIG. 3) that is greater than (e.g., about twice) an f# (i.e., second f# 24 in FIG. 3) of the projection subsystem 20. Stated differently, the exiting angle of relay lens 18 is about half that of the acceptance angle of projection subsystem 20. In some embodiments of the present invention, the relay lens 18 has an f-number of f/6 or greater, and the projection subsystem 20 has an f-number of f/3 or smaller. As mentioned earlier, the relay lens 18 can have a long first working distance Wa that may be needed to accommodate beam combining from different imaging channels. Alternatively, the projection subsystem 20 has a second working distance Wb that can be substantially less than the first working distance Wa. While the projection subsystem 20 needs to accommodate the optics of the speckle reduction system (e.g., speckle reduction element 40), and perhaps a field lens, the space required is much less compared to accommodating combiner 14. In some embodiments, the first working distance is 150 mm or greater, and the second working distance is 50 mm or smaller. Since the projection subsystem 20 is optically faster, but can have a shorter working distance, it becomes much easier to design and fabricate than a lens that is both fast and requires a long working distance as is common to current digital cinema projection lenses.

Likewise, the design of relay lens 18 is advantaged as it is working at small magnifications (1×-2×). While relay lens 18 still provides a long working distance Wa, this lens is optically slower than the conventional digital cinema projection lenses, and thus relay lens 18 is also less expensive to fabricate and design. Further, as the optical combiner 14 is now in a relatively slow portion of the optical path, the optical coatings therein become much less difficult to design and fabricate, as they only need to combine over smaller angles. In the case of MEMs spatial light modulators that differentiate input and output light based on angular differences between the two, the contrast ratio is enhanced. These f-number and working distance relationships optimize the effective imaging performance to provide low cost optical design simplicity, simpler optical coatings, as well as high image quality parameters of high contrast ratio and speckle reduction by increasing the angular diversity discussed below.

Returning to FIG. 3, relay lens 18 directs its cone of light to form an intermediate image 22 at an intermediate image plane 21 proximate to the speckle reduction system, which, in this case, includes a speckle reduction element 40, which is moved by an actuator 49. The speckle reduction element 40 alters the intermediate image 22, or the light propagation from there, in a manner (e.g., by phase changes, angular changes, or both) that reduces speckle visibility in the projected image by temporally changing the coherent interference of the reflections with the display surface 30.

A movement-generating system (e.g., actuator 49 shown in FIG. 4) can be a part of the speckle reduction system. The movement-generating system provides vibration, rotation, or other repeating or random movement to the speckle reduction element 40 while the intermediate image passes through it in order to reduce speckle.

In one embodiment, the speckle reduction element 40 is an optical diffuser, such as a volume or a surface relief diffuser (e.g., a holographic diffuser). In such cases, the movement-generating system comprises an actuator 49 known in the art to cause in-plane motion of the diffuser back and forth, or rotationally in the plane of the diffuser, such that the diffuser remains at or near the intermediate image plane 21. In other words, "in-plane motion" means, for example, motion in a direction perpendicular to the optical axis (in the example of FIG. 2, axis O) of the speckle reduction element 40.

The diffuser, when used as speckle reduction element 40, is known to change the random phase of image light associated with each intermediate image pixel 23 forming diffused image pixels 23', as shown in FIG. 5b. The actual speckle reduction from the movement-generating system in this configuration is dependent on several factors, including the attributes (size, shape, and distribution) of the diffuser features (or structure), the characteristics (rate and range) of diffuser motion, the number of projection lens resolution elements (image pixels) on the display surface 30, and the characteristics of the scattering features on the screen (display surface 30). As the phase structure of the image light associated with the intermediate image pixels is changed by the motion of the speckle reducing element (diffuser) 40, the incident phase and position to the display surface 30 is changed slightly as well, thereby changing the interaction with the display surface micro-structure, and the speckle interference in the reflected light. The viewer's effective eye resolution (determined by the viewer's distance from the screen and the viewer's personal visual acuity (20-20, for example)) also impact speckle visibility. The speckle visibility decreases as the number of diffuser features and image pixels on display surface 30 increase, but is ultimately limited to a non-zero value.

It is noted that while an optical diffuser can be used for the speckle reduction element 40, it also impacts light propagation through the system 50 in several ways. As one example, placement of a diffuser at or near intermediate image plane 21 essentially defines a new object, the diffused image 22' shown in FIG. 5b, within the system 50, as the angular extent (or NA) of the light is increased. The change in angular extent can be modeled as a convolution of the light diffusion profile and the incident light distribution (relay lens F# (19)). Of course, the effective etendue that the projection lens needs to accommodate is likewise increased. As a second impact, the effective size of the intermediate image pixels 23 at the intermediate image plane 21 is increased, as the diffuser features and diffuser motion, introduce blurring and contrast loss, creating diffused image pixels 23'. When this new image object, diffused image 22', with its diffused image pixels 23', is imaged to the display surface 30 by projection subsystem 50, the projected image quality, relative to resolution (or MTF) is reduced.

Again considering FIG. 2, relay lens 18 comprises at least one relay lens element L1, and can include an optional field lens L2, which can be located adjacent the speckle reduction element 40 along the optical axis O, without intervening lenses between it and the speckle reduction element 40. In the case of FIG. 2, the field lens L2 is located between the speckle reduction element 40 and the relay lens element L1, and facilitates direction of the intermediate image 22 into the speckle reduction element 40 in a manner that causes the diffused image light from the resulting diffused image 22' to enter an acceptance aperture of the projection subsystem 20. In other embodiments, the field lens L2 can be located downstream of the speckle reduction element 40, while still prior to projection subsystem 20. Output from the speckle reduction element 40 is a phase-altered image, which is projected by the projection subsystem 20 onto a display surface 30 (not shown in FIG. 2).

While the image size of the intermediate image 22 at intermediate image plane 21 may be equal to, smaller, or larger than the area of the light modulator 12, in many cases it is desirable for the image area to be equal to or larger than the area of the modulator 12, as NA collected by the projection lens 50 can be reduced. In this regard, the image forming system (e.g., light modulators 12r, 12b, 12g and combiner 14) can project a combined initial image towards the relay system (e.g., relay lens 18), the initial image having a first size corresponding to the size of the light modulators. The relay system (e.g., relay lens 18) can then form an intermediate image 22 having a second size greater than or equal to the first size.

In some embodiments of the present invention, the second size, i.e., the size of the intermediate image 22 at intermediate image plane 21, is magnified by the relay system (e.g., relay lens 18) to be consistent with a motion picture film size, such as 16 mm, 35 mm, or 70 mm film formats. These motion picture film sizes have diagonals of 13.73 mm, 25.81 mm and 52.80 mm for the 16 mm, 35 mm and 70 mm film formats, respectively. Having an intermediate image 22 at these motion picture film sizes allows the use of a conventional film projection lens in projection subsystem 20, such as a lens designed and used for conventional 16 mm, 35 mm, or 70 mm film projectors, thereby reducing cost and simplifying design.

In particular, film-based projection lenses, such as lenses sold by Schneider Kreuznach of Germany, are offered in a range of nearly 30 different focal lengths from 24 to 100 mm in order to accommodate the variety of screen distances and diagonals present in the motion picture industry. This variety of lenses allows theatre operators to select the best solutions for their particular venues. Some lenses such as the Variable Prime lens are also designed to handle different film format ratios 1:137 to 1:1.85, while others use anamorphic optics to deliver wide format Cinemascope content of 1:2.39 format. This wide availability and format flexibility offers a significant advantage over conventional digital cinema lenses that are more expensive and limiting. Schneider offers only twelve fixed lenses for digital cinema. Perhaps more significantly, the f-number of these common film projection lenses typically range between f/1.7 to f/2.8. This lower f-number range is particularly suited to reduce the speckle from the coherent light sources by using temporally averaged angular diversity as opposed to more common random phase walk of a common diffuser. However, these lenses only have back working distances in the range of 30-57 mm, which can be too small to accommodate digital projector attributes such as beam combining from three colors. In utilizing conventional film projection lenses, the availability and ease of changing format size is also increased. Common anamorphic lenses are also capable of being used to switch to formats like Scope for exceptionally wide viewing.

Figure 5C:
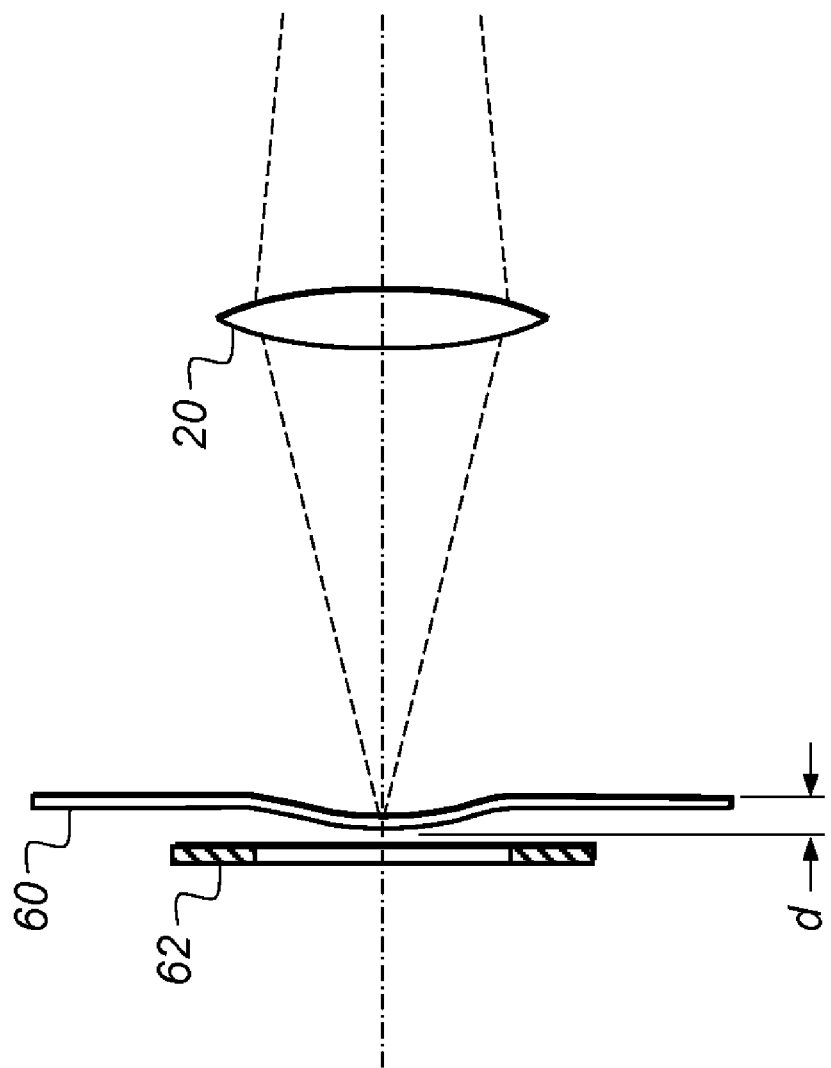
FIG. 5c illustrates film buckle and film imaging as occurs in a conventional film-based projection system.

One consideration in utilizing conventional film projection lenses for digital cinema applications is that many of the higher quality conventional film projection lenses are designed to compensate for film curvature or "buckle", which is illustrated in FIG. 5c. When the image area of the film 60 is illuminated, the film emulsion absorbs light in accordance with the image content. The resulting heat causes the film, which is an elastic polymer sheet material, to buckle or bow out of plane by some distance "d". This effect is compounded by the uneven illumination and uneven heating of the image area, through the aperture plate 62, relative to the surrounding un-illuminated areas provided for the sound track, perforations, and the framing bars. The illuminated area expands, while the fixed area does not, forcing the imaging area to shift in the optical axis direction, thereby introducing as much as d~150-400 μm of film surface curvature, buckling towards the illumination source. Thus, with respect to the projection lens 20, the film 60 is now a curved object that is imaged to the screen 30.

The least expensive film projection lenses often are designed for a flat image plane, thus causing defocus on the outer edges of the imaged area (assuming the projectionist sets focus to the image center). These lenses, if their performance characteristics are suitable, can be desirable for use with a digital spatial light modulator 12 where the image plane remains flat during projection. On the other hand, the more expensive film projection lenses 20 that provide the best projected image quality, are also designed to optimally image a curved object (the film 60) having a film buckle depth d~100-200 μm sag over a ~1 inch wide area, to compensate for the film buckle effects, e.g., the film plane deviation from illumination system heating.

With respect to the present invention for digital projection, the unlikely combination of imaging planar (flat) light modulators 12 to an intermediate image plane 21 that is co-aligned to a curved object plane expected by a film-type projection lens, can be accommodated in several ways. Considering FIG. 2, relay lens 18 is relatively slow as compared to the projection subsystem 20. In the case of relay lens L1, it is less important to correct for the small image plane sag of 100-200 μm, as the depth of focus of lens L1 is greater. Depth of focus (DOF), is shown in slide 5a, and is defined by:

$$DOF = \pm \frac{\phi}{2*\tan\left(\arcsin\left(\frac{1}{2*f\#}\right)\right)}$$

where ϕ=the blur circle diameter. To be resolvable, the size of the intermediate image pixels 23 presented to the intermediate image plane 21 would approximately equal the blur circle diameter, if not larger. For example, if the spatial light modulators 12 comprise arrays of 10 μm pixels that are imaged at a magnification of 1.2× to the intermediate image plane 21 then the resulting 12 μm intermediate image pixels should be comparable in size to the blur circle diameter (ϕ), or 2-3× larger.

The depth of focus is a distance in the Z direction in which the size of the blurred spot grows by some defined amount that is deemed tolerable. Diffraction, aberrations, or defocus, or combinations thereof, in varying quantities, can cause the spot blurring. For example, Rayleigh's quarter wave criterion is a common metric used in imaging systems. Using the equation above, and given an f/6 relay lens 18, the depth of focus at the intermediate image plane 21 would be about 120 μm, which is on the order of a standard film projection lens curvature. So in this case, the relay lens 18 roughly accommodates, within the depth of focus, the image plane curvature without significant correction required. Nominally, the relay lens 18 is positioned axially along the optical axis O, such that the best quality image location (best MTF) provided by the relay lens 18 substantially overlaps the best object conjugate plane location of the projection lens 20. Relay lens 18 can also be designed to present a curved image of the modulators 12, with an appropriate curvature, to the film type projection lens 20.

On the other hand, a mis-match between a projection lens 20 designed to optimally image a curved object and a planar intermediated image cannot be readily left uncorrected, as the depth of focus (DOF) of these projection lenses is comparatively small. For example, using an intermediate image pixel size of 12 μm and a projection subsystem 20 of f/1.7, the depth of focus is only about 36 μm. This small depth of focus justifies the need to match the curved plane of best imaging of a film type projection lens 20 with the intermediate image 22 and the surface of the speckle reduction element 40.

Figure 4:
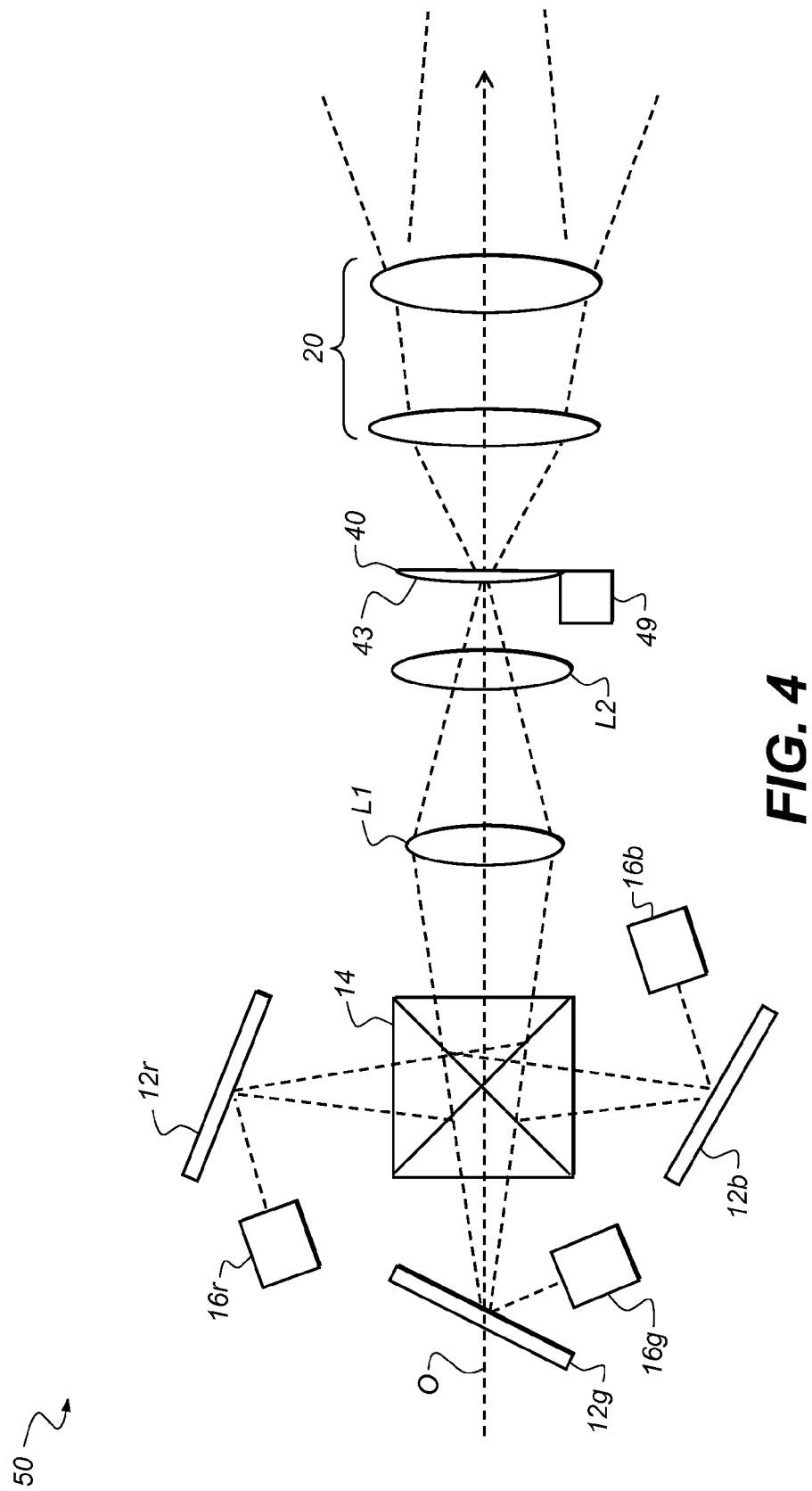
FIG. 4 is a diagram showing an apparatus of an embodiment of the present invention with a speckle reduction element having a curved surface.

In one embodiment shown in FIG. 4, the speckle reduction element 40 has a curved surface 43 through which the intermediate image 22 is received. In other embodiments (not shown), the speckle reduction element 40 has a curved surface through which a diffused image 22' or intermediate image 22 exits, to be imaged by projection lens 20. In either case, the curvature can be convex or concave. Regardless, the curved surface has a curvature that matches or substantially matches the film buckle curvature for which these commercially available film type projection lenses are corrected. Surface structures can be place onto curved surface 43 in a random or ordered pattern. In one embodiment lenslets are formed ontop of the general curvature. In an alternate embodiment the surface structure can be of phase depth by etching, polishing, or molding. In cases where the curved surface 43 of the speckle reduction element 40 is fabricated using etched or polishing processes, device fabrication can be relatively straightforward. By comparison, it can be difficult to fabricate the surface features of a lithographically curved speckle reduction element 40 as this process works primarily with flat wafers. It would be possible to lithographically pattern the surface features of a speckle reduction element 40 on a flat substrate, and then create flexible or curved speckle reduction elements 40 by replication and molding processes. For example, a flexible master could then be used to cast the speckle reduction surface features onto a spherical surface plane base or a piano surface with a second surface that contains optical power. Thus, an inexpensive replicated speckle reduction element 40 can be created that has optical correction for a curved image plane.

An alternate method, in lieu of generating a curved surface on the speckle reduction element 40 is to add a correction lens system (L2 in FIG. 2 could be configured as such a corrector lens) to correct for this pre-existing image curvature of commercially available film projection lens. This correction lens system, separate from speckle reduction element 40, would only need to be a simple corrector lens with very little optical power placed between the relay lens element L1 and the conventional projection subsystem 20. In this regard, the correction lens system (e.g., L2) can be located upstream or downstream of the speckle reduction element 40, and can be located adjacent the speckle reduction element 40 in the optical axis O with no intervening lenses between it and the speckle reduction element 40. In addition, the correction lens system can comprise a lens having only one or both sides curved, and such curvature can be convex or concave, depending upon design choice. Or, as with all lens systems, more than one lens may be used. Accordingly, one skilled in the art will appreciate that the invention is not limited to any particular implementation of the correction lens system, so long as it compensates for the film buckle correction of the standard cinema film type projection lenses discussed previously. Further, this correction lens system could be standard or optional for projection systems 20 depending on the particular commercially available lens selected.

Turning back to a general discussion regarding speckle reduction element 40, such element 40, regardless of film buckle corrections and independent of the type of relay and projection lenses used, is located at, or substantially at, the intermediate image plane 21, according to some embodiments of the present invention. Further, regardless of film buckle corrections and independent of the type of relay and projection lenses used, the speckle reduction element 40 can be diffusive, such as by including a diffuser, or refractive, such as by including a lenslet arrangement 44 thereon, as will be discussed below.

In embodiments where the speckle reduction element 40 is diffusive, such element 40 provides phase shifting and diffusion of the intermediate image 22. As discussed above, courtesy of actuator 49, this shifting occurs on a temporal basis, such that the effective spatial coherence of the light output by the projection subsystem 20 is averaged by the eye to effectively reduce the speckle perceived by a viewer. The speckle reduction element 40 can be a diffractive element that can be fabricated from many different materials such as glass, fused silica, plastics or epoxy. For high-light-level-polarizationbased optical systems it is important that the material does not absorb light such that heat induced stress birefringence occurs. Similarly, a variety of methods can be used to fabricate speckle reduction element 40, such as etching, polishing, molding, lithography, and holography. Again, for polarization sensitive systems, a method that does not induce stress birefringence is desired. These diffusers may be created with random or periodic patterns to minimize speckle.

As mentioned previously, with respect to FIGS. 5a and 5b, use of diffusers can cause image blurring and loss of resolution. Additionally, the increased angular spread introduced by conventional diffusers, while beneficial to reducing the speckle effect, also increases the effective system Lagrange, and thus the required cone angle (or numerical aperture (NA)) to collect all of the diffused light. This decrease in the f# of the projection lenses 20 can increase the cost and difficulty of lens fabrication. For example, common ground glass diffusers behave essentially in a Lambertian manner, where significant amounts of light 55 spill outside the collection f-number 24 of the projection subsystem 20 as shown in FIG. 3. Even modern holographic diffusers can significantly increase the angular extent, increasing spill light 55, light efficiency loss, projection lens aperture, and image blurring.

Light diffusion or scattering occurs from a combination of refractive and diffractive effects, which can be volumetric or surface related. Diffraction from the surface of speckle reduction element 40 causes an angular spread containing lower order (angle) and higher order (angle) content. It is commonly known that for diffraction from a circular aperture, roughly 99% of the energy from diffracted light falls within the $4^{th}$ dark ring of the Airy disk pattern formed by the aperture. It can be desirable to design the diffusive structure such that most of the angular spread by diffraction is within the acceptance aperture (F# 24) of the projection subsystem 20. For example, the speckle reduction element 40, in some embodiments where such element 40 is significantly diffractive, directs the energy from the $4^{th}$ order and below into the acceptance aperture of the projection subsystem 20. There is a diminishing return in energy collection in requiring a lower f-number projection lens.

While a diffusive speckle reduction element 40 is effective at reducing perceived speckle, the surface treatments and structure types that create a diffused image 22' from the intermediate image 22 often create a loss of energy due to diffraction that can overfill the projection system 20. This diffused image 22' essentially becomes an object relative to the projection subsystem 20, with new wavefront and image quality parameters. While aberrations from relay lens 18 are imparted to the pixel structure, size, and shape, of the diffused image pixels 23' of diffused image 22', the projection subsystem 20 cannot be optimized to correct for them because the original phase (wavefront) content is lost by the diffusive speckle reduction element 40.

An alternative method to speckle reduction to that of using a diffusive speckle reduction element 40 is to use a refractive speckle reduction element 40 that angularly shifts the intermediate image 22 while preserving at least some of the original phase content. As before, the refractive speckle reduction element 40 can be placed at the intermediate image plane 21 where the intermediate image 22 is formed by the relay system (relay lens 18) and other upstream optics. Unlike the diffused image 22' generated by a diffusive speckle reduction element 40, a refractive, speckle reduction element 40 placed at or substantially at intermediate image plane 21 passes intermediate image 22 while preserving substantial wavefront data projected by relay lens 18.

In some embodiments, this refractive speckle reduction element 40 is a structured window element 45 comprising a lenslet arrangement (44 in FIGS. 3, 6a, and 6b) that is temporally moved as was described with respect to a diffusive speckle reduction element 40. Unlike a diffusive speckle reduction element 40 that creates random phase walk, such a structured window element generates temporally varying angular diversity that changes the interaction of the incident light with the microstructure of display surface 30, and thus the reflected light interference, thereby reducing speckle.

Figure 6A:
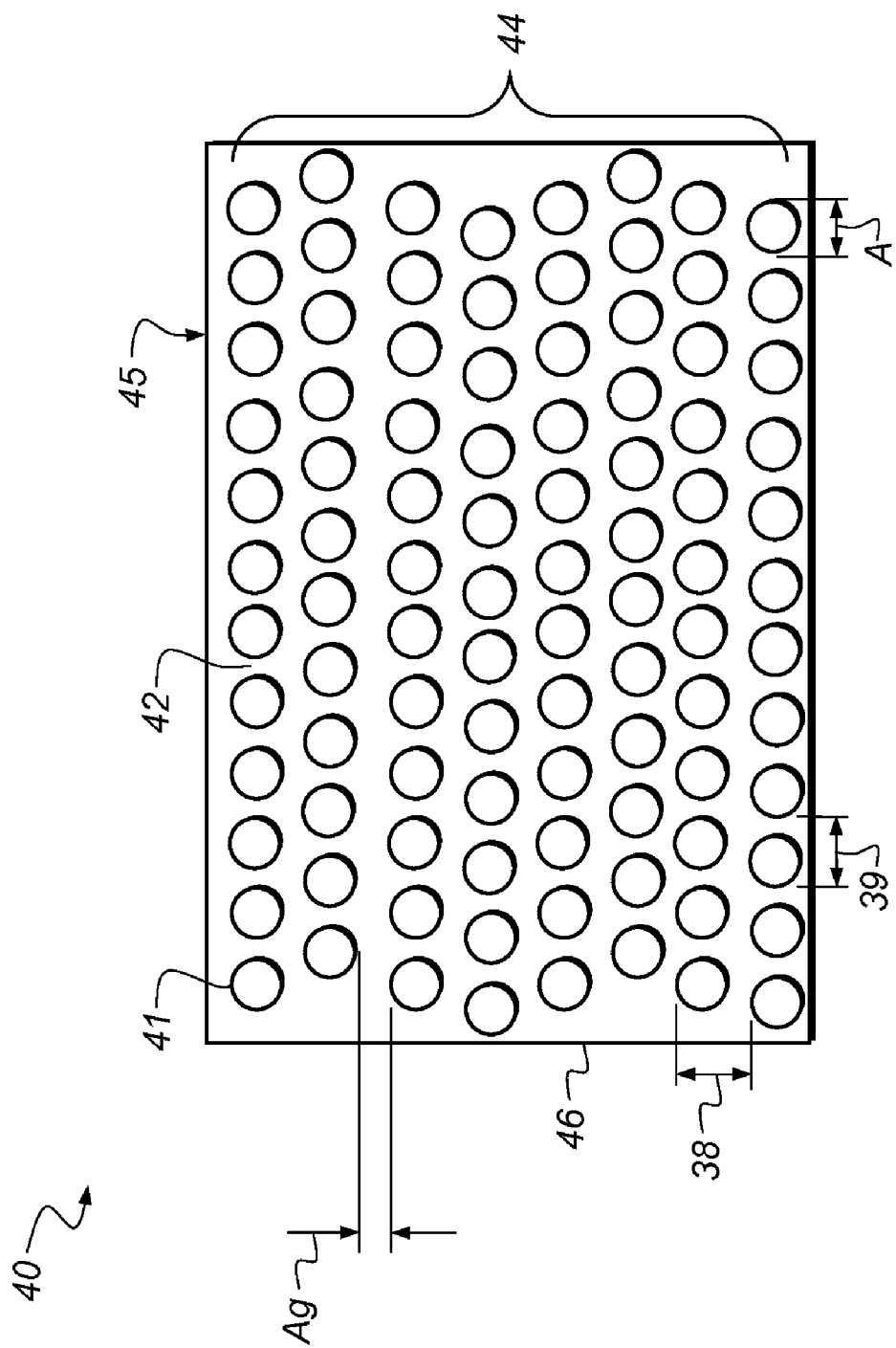
FIG. 6a is a diagram of an embodiment of a speckle reduction element that utilizes sparse microlenses.
Figure 6B:
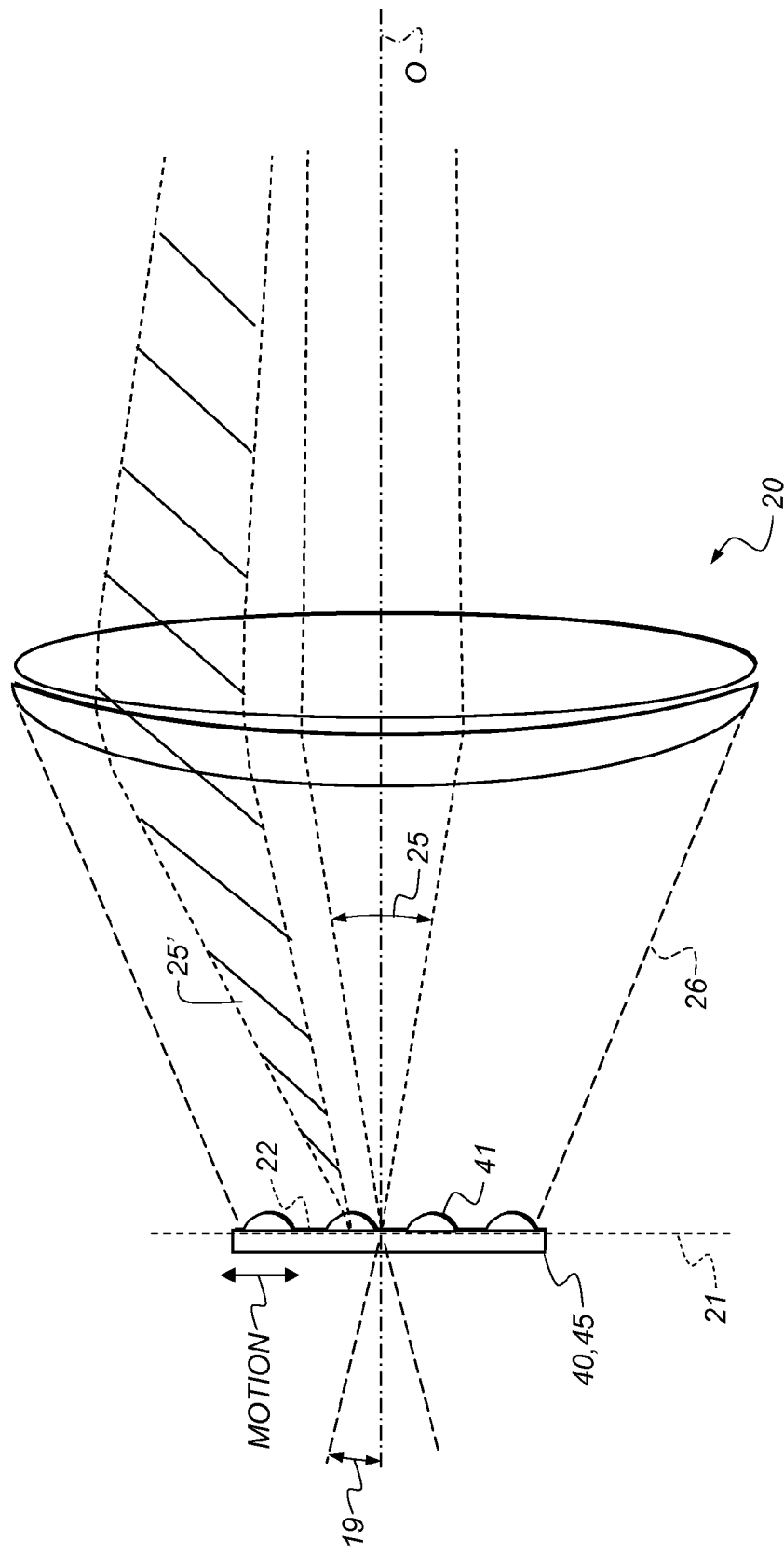
FIG. 6b illustrates the use of a speckle reduction element in increasing angular diversity of imaging through a projection lens, according to an embodiment of the present invention.

As shown in FIG. 6a, the structured window element 45 can be constructed of lenslets 41, each with an aperture A, formed on a substrate 46. Consequently, as illustrated in FIG. 6b, each lenslet 41 acts like a sub-aperture field lens that deflects the image light collected by the projection lens 20 about the acceptance aperture of the projection lens as the structured window element 50 is moved by actuator 49. A lenslet 41 samples at least one intermediate image pixel 23 formed by the relay lens 18 and then redirects the angular extent (cone or solid angle 25) of the light associated with a given intermediate image pixel 23 into different portions (deflected solid angle 25') of the relatively large acceptance aperture (captured solid angle 26) of the projection subsystem 20 on a temporal varying basis, in conjunction with movement of such structured window element 45 by the movement generating system (e.g., actuator 49). Consequently, the movement generating system steers image light of the intermediate image 22 into an acceptance aperture of the projection subsystem 20 as the intermediate image 22 is transferred through the arrangement of lenslets 41 of the speckle reduction element. The projection subsystem 20 then projects the steered image light of the intermediate image, as transferred through the moving speckle reduction element onto a display screen, which reflects a reduced-speckle image. Because the lenslets 41 primarily provide a mechanism for beam steering, rather than diffusion, for a given field point (a given intermediate image pixel 23), the corresponding on-screen image is formed in substantially the same location on display surface 30, whether the image light is deflected upwards or downwards, or to the side, or minimally, or not at all, depending on the position of the nearest lenslet to that given pixel at a given point in time. Thus, through the combination of each moving lenslet 41 and projection subsystem 20, angular steering occurs that is delivered to the image projection surface 30 (shown in FIG. 1) with minimal image quality loss. Any image quality loss would be due, at least in part, to the small change in optical power that each lenslet 41 delivers. Residual diffusion effects may also increase the collected solid angle from an intermediate image pixel 23, or reduce image quality.

As mentioned earlier, a refractive speckle reduction element 40 can be a structured window element 45 having lenslets 41 that each have an aperture A, as shown in FIG. 6a. The size of that aperture is relatively large compared to the surface structures of common diffuser surfaces like etched glass. While the lenslet aperture A may be round, square, or other shape, it is useful to understand the properties that deliver proper sampling of the pixel size to reduce speckle and deliver most of the light to the display surface 30. The diffraction equation for a circular aperture shows the relationship between the lenslet diameter (aperture A) and the angular spread of the $4^{th}$ dark ring is given by:

$$A = 4.24 * \lambda/\alpha$$

Where:
A=lenslet diameter or aperture
α=angular spread (radians)
λ=wavelength of interest For example, if lens 20a is an f/2.8 lens, it has an acceptance angle α of approximately 0.18 radians. For a wavelength of 0.000550 mm light, the smallest lenslet size (diameter A) is approximately 13 µm. This size is on the order of the spatial light modulator pixels (5-15 µm), or the images thereof (i.e., the intermediate image pixels). At substantially smaller sizes than approximately 13 µm, significant amounts of light are diffracted or scattered and are lost. Therefore, a solution has each lenslet sampling one or more intermediate image pixels 23 of the intermediate image 22 at the intermediate image plane 21. In other words, each of all or substantially all of the lenslet apertures A is greater than or equal to a size of an intermediate image pixel 23 at the intermediate image plane 21. In some embodiments, it can be beneficial to have lenslet apertures A greater than a size of $N^2$ intermediate image pixels of the intermediate image at the intermediate image plane 21. In some embodiments, N is ~2-4. Since the lenslet apertures A are relatively large with respect to the size of an intermediate image pixel 23, the pixels 23 essentially see the lenslet 41 effectively as a window.

It is also useful to understand the parameters of the gaps 42, if any, between the lenslet structures. In this regard, a slit aperture diffractive model may be used where the lenslets 41 are directly abutted to provide a simplified analysis. Slit apertures behave in a similar fashion as circular apertures in this regard. 83.8% of the energy occurs inside the first dark ring, in this example about 4 µm, as given by:

$$Ag = 1.22 * \lambda / \alpha$$

The percentage of energy inside the particular bright bands appears below:

| Order | Circular Aperture | Slit Aperture |
| --- | --- | --- |
| 0 order | 83.8% | 90.3% |
| $1^{st}$ order | 7.2% | 4.7% |
| $2^{nd}$ order | 2.8% | 1.7% |
| $3^{rd}$ order | 1.5% | 0.8% |
| $4^{th}$ order | 1.0% | 0.5% |

There is a diminishing return in energy collection either in requiring a lower f# projection lens 20 or in making the diffusive structures smaller, especially where some of the diffraction from the 0th order beam is lost. For visible light, it is desirable to have even the gap structures on the order of a magnified pixel dimension of Ag~5-20 µm. Again, designs where the dimension of the structure capture the full zeroeth order to the full $4^{th}$ order would effectively simplify the optics and capture increased energy. In other words, in some embodiments, the lenslet arrangement 44 is configured at least to pass a fourth order energy or lower of the intermediate image, as transferred through the speckle reduction element, into an acceptance aperture of the projection subsystem. Stated differently, in some embodiments, an acceptance aperture of a lens in the projection subsystem 20 captures a fourth order energy or below of the intermediate image, as transferred through the speckle reduction element.

Considering FIG. 6b from another perspective, the incident F# (19) to the intermediate image plane 22 provided by the relay lens 18 is substantially preserved when the image light transits a speckle reduction element 40 that is structured window element 45. That is, aside from any residual diffusion, both Lagrange and wavefront (or phase) information are substantially preserved, whether the light traverses the window-like lenslet gaps 42 or is deflected by the lenslets 41 into the larger acceptance F# of the projection lens (24). Thus, a magnified image of a given intermediate image pixel 23 is then provided at the display surface 30, with a minimal loss of image quality, whether the image light traversed a deflected or un-deflected path through the projection subsystem 20.

Embodiments that include a structured window element 45 as a refractive speckle reduction element 40 can have the lenslet arrangement 44 on the upstream side of the element 40 (facing the relay lens 18, e.g.) or on the downstream side of the element 40 (facing the projection subsystem 20, e.g., as shown in FIG. 3). In addition, in embodiments where the refractive speckle reduction element 40 has a curved surface to compensate for film buckle corrections in projection subsystem 20, the lenslet arrangement 44 can be on the curved surface or on a flat surface on an opposite side of the curved surface, if applicable. The lenslet arrangement 44 primarily causes the corresponding surface of the structured window element 45 to be refractive. In some embodiments, the lenslet arrangement 44 entirely or almost entirely includes abutting lenslets, as shown, for example, in FIG. 3. In other embodiments, such as illustrated by FIGS. 6a and 6b, the lenslet arrangement 44 entirely or almost entirely includes sparsely distributed (e.g., non-abutting) lenslets 41 with gaps 42 between lenslets 41. The gaps 42 comprise the space between the lenslets 42, where the front and back surfaces of the substrate 42 are nominally parallel to each other. In either case, some diffusion is caused by the lenslet arrangement 44. For example, when the lenslets 41 are abutting, the valleys between abutting lenslets 41 cause some diffusion, by residual diffraction and edge effects. On the other hand, when the lenslets 41 are not abutting, some diffusion can be caused by the spaces or gaps 42 between the lenslets 41 (by diffraction or scattering). Regardless of the cause of such diffusion, an acceptance aperture (indicated by captured solid angle 26) of a lens in the projection subsystem 20 captures such diffusion caused by spacings between the lenslets or valleys between abutting lenslets 41, in some embodiments of the present invention. In embodiments where non-abutting lenslets 41 are used, it can be desirable to have or substantially have the gaps 42 between the lenslets 41 be large enough to allow diffused light from the lenslet gaps 42 to pass into an acceptance aperture of the projection lens 20. In one embodiment the lenslet gaps 42 are greater than or equal to a size of a pixel of the intermediate image at the intermediate image plane. Basically, as discussed previously, this means that the lenslet gaps 42 should be large enough (Ag) that they do not cause significant diffraction effects.

Further in this regard, in some embodiments, a combination element can be used as speckle reduction element 40, the combination element causing a more equal amount of diffusion and refraction, or diffraction and refraction, to generate both temporally varying angular diversity and some level of random phase walk. For example, the lenslet gaps 42 may not be planar, but have some mild surface structure, with a randomly mottled profile with large spatial features (several microns) and minimal sag, to introduce mild diffusion. In some embodiments, a lenslet or prism array can be utilized where the surfaces of the lenslet or prism structure are further structured with variable or fixed phase shifted depth content in addition to the angular shifts due to refraction. Thus, as the speckle reduction element 40 is moved, there is an angular shift of the image into the projection lens and also a phase walk of the coherent light.

Embodiments that include a structured window element 45 having lenslet arrangement 44 as a refractive speckle reduction element 40, the arrangement of the individual lenslets 41 can be or substantially be hexagonal, diagonal, random, or linear in either of the two dimensions to create the pattern. It can be beneficial in some embodiments to have the movement generating system move the speckle reduction element 40 in-plane a distance that is greater than or equal to a period of lenslet repetition (one lenslet and one gap (if present), e.g., vertical lenslet period 38 horizontal lenslet period 39 in FIG. 6*a*), thus allowing the full range of angular diversity from a lenslet 41. This motion allows averaging over the temporal response of the eye. As with the prior discussions regarding a diffusive speckle reduction element 40, the structured window element 45 can be moved in plane (with the X-Y plane shown in FIG. 5*a*) any number of ways, such as by a linear transducer or by being rotated using a motor. Consequently, one skilled in the art will appreciate that actuator 49 can take any of a number of forms, including a piezoelectric translator, for example.

It can be beneficial in some embodiments to have out-of-plane motion (along the Z-axis (see FIG. 5*a*)) of the speckle reduction element 40, regardless of whether it is diffractive or refractive, provided that such motion is within the depth of focus of the faster projection subsystem 20, plus some margin for allowable defocus at the screen. Since relay lens 18 has a much larger depth of focus, which is nominally overlapped with the projection lens depth of focus, a system 50 designed under this constraint will have little image quality loss. "Out of plane motion" in this context refers to motion that is parallel or substantially parallel to a direction of an optical axis of the speckle reduction element 40, which, in the example of FIG. 2, is axis O. Such out-of-plane motion that generally remains within the depth of focus of the projection subsystem 20 and relay lens 18 further reduces speckle by inducing additional angular diversity or phase shift without substantially impacting pixel resolution. In embodiments where out-of-plane motion is provided to the speckle reduction element 40, in-plane motion can also be provided.

In order to reduce the loss of light from speckle reduction element 40, whether diffractive or refractive, it can be beneficial that the speckle reduction element 40 be designed such that the combination angle of the image light (within f# 19) from the relay lens 18, plus the angular diversion and diffusion formed by speckle reduction element 40 (see FIG. 6*b* for the case of a refractive speckle reduction element 40) be equal or substantially equal to the capturable solid angle 26 or acceptance f-number 24 of projection subsystem 20 (shown as item 24 in FIG. 3). For example, if the f# out of a refractive speckle reduction element 40 is substantially greater than around f/5 with a projection lens f# of around f/2.5, speckle reduction would be reduced due to the lack of angular diversity. Alternatively, if the f# out of a refractive speckle reduction element 40 is smaller than that of the projection subsystem 20, some light will not be collected by the projection subsystem 20 and optical throughput will be decreased.

Notably, when illumination is from lasers, internal components of coherent light projection system 10 can have a low etendue, typically in the range of about f/6. Such low etendue is advantaged from an optical design perspective, allowing the use of smaller, slower, and less expensive lens elements and light modulators internal to each of the color channels.

The digital micromirror or DLP device works most effectively when its modulated light, the light reflected from its mirror elements, is substantially telecentric, emerging substantially parallel to the optical axis. Low-etendue light sources such as lasers are advantaged for providing illumination in telecentric systems and are well-suited for providing DLP illumination sources.

Embodiments of the present invention described herein help to compensate for speckle by correcting it within an intermediate image. An intermediate image can be formed in a size or format that emulates conventional film formats, enabling the use of off-the-shelf projection lens designs for subsequent projection onto the display surface. Thus, various embodiments of the present invention allow the use of laser and related highly coherent sources, advantaged for brightness and spectral characteristics, with digital light modulators, without excessive speckle.

The invention has been described in detail with particular reference to certain embodiments thereof. It is to be understood, however, that variations and modifications can be effected that are within the scope of the invention. For example, lens elements could be fabricated from any suitable type of lens glass or other optical material. Lens mounting arrangements of various types can be provided. A variety of types of laser light sources can be used, including laser arrays, for example. Any of a number of different types of light modulators can be used, including digital micromirrors, liquid crystal display (LCD) devices, electromechanical grating devices such as grating electromechanical system (GEMS) devices and grating light valve (GLV) devices, or other types of pixellated array devices. While embodiments using three primary colors (RGB) have been described, embodiments of the present invention can also be used where more or fewer than three light sources or modulators are utilized. Further, the terms "system" and "subsystem" often is used in this description to acknowledge that, although certain embodiments illustrated herein have a particular arrangement of lenses or other components, one of ordinary skill in the optical arts will appreciate that such particular arrangements could be replaced by one or more other arrangements to achieve the same functions described herein. For example, the relay system is often described herein as including a relay lens 18. Such lens 18 could be replaced by a plurality of lenses that still form an intermediate image 22 at the intermediate image plane 21. The same reasoning applies to the projection subsystem 20 and the other systems described herein. Further, the terms "system" and "subsystem" are also used in this description to acknowledge that additional conventional components not shown or described herein can also be present. For example, the relay system 18 may include a relay lens L1, but it likely also includes lens-mounting hardware, certain optical coatings, etc.

PARTS LIST

| | |
|---|---|
| 5 | Object Plane |
| 7 | Displayed Image Plane |
| 10 | Coherent light projection system |
| 12r, 12g, 12b | Light modulator |
| 14 | Combiner |
| 16r, 16g, 16b | Light source |
| 18 | Relay lens |
| 19 | Relay lens f# |
| 20 | Projection subsystem |
| 20a | Lens of projection subsystem |
| 20b | Lens of projection subsystem |
| 21 | Intermediate image plane |
| 22 | Intermediate image |
| 22' | Diffused image |
| 23 | Intermediate image pixels |
| 23' | Diffused image pixels |
| 24 | Projection subsystem entrance f# |
| 25 | Solid angle |
| 25' | Deflected solid angle |
| 26 | Captured solid angle |
| 30 | Display surface (or screen) |
| 38 | Vertical lenslet period |

| | |
|---|---|
| 39 | Horizontal lenslet period |
| 40 | Speckle reduction element |
| 41 | Lenslet |
| 42 | Lenslet gaps |
| 43 | Curved diffuser surface |
| 44 | Lenslet arrangement |
| 45 | Structured window element |
| 46 | Substrate |
| 49 | Actuator |
| 50 | Coherent light projection system |
| 55 | Spilled light |
| 60 | Film |
| 62 | Aperture plate |
| L1 | Relay lens element |
| L2 | Field lens (or correction lens) |
| O | Optical axis |
| Wa, Wb | Working distances |
| d | film buckle |
| ∅ | Blur circle diameter |
| A | Lenslet aperture |
| Ag | Lenslet gap aperture size |

What is claimed is:

1. A coherent light projection system comprising: a coherent light source system configured at least to emit coherent light; an image forming system configured at least to interact with the coherent light in a manner consistent with image data; a relay system configured at least to form an intermediate image at an intermediate image plane from coherent light output from the image forming system, the intermediate image being an aerial real image; a speckle reduction element located at or substantially at the intermediate image plane; a projection system configured at least to project the intermediate image, as transferred through the speckle reduction element; and a movement-generating system configured to cause motion of the speckle reduction element both in a direction parallel to an optical axis of the projection system and in a direction perpendicular to the optical axis of the projection system, wherein the motion of the speckle reduction element in the direction parallel to the optical axis remains within a depth of focus of the relay system and the projection system.

2. The system of claim 1, wherein the image forming system comprises light modulators and a dichroic combiner that aligns a plurality of color channels from the coherent light source system onto a common axis.

3. The system of claim 1, wherein the speckle reduction element comprises a lenslet arrangement formed on a surface of the speckle reduction element, the lenslet arrangement comprising lenslets each having an aperture, wherein a size of the lenslet apertures is greater than or equal to a size of an image pixel of the intermediate image at the intermediate image plane.

4. The system of claim 3, wherein the lenslet arrangement comprises a random or substantially random distribution of lenslets.

5. The system of claim 3, wherein the lenslet arrangement comprises lenslets in or substantially in a hexagonal, linear, or diagonal pattern.

6. The system of claim 3, wherein the lenslet arrangement entirely or almost entirely comprises abutting lenslets.

7. The system of claim 3, wherein the lenslet arrangement entirely or almost entirely comprises non-abutting or sparsely distributed lenslets.

8. The system of claim 3, wherein the motion of the speckle reduction element in the direction perpendicular to the optical axis is greater than or equal to a period of lenslet repetition.

9. The system of claim 3, wherein the lenslet arrangement is configured at least to pass a fourth order energy or lower of the intermediate image, as transferred through the speckle reduction element, into an acceptance aperture of the projection subsystem.

10. The system of claim 1, wherein the image forming system is further configured to project an initial image having a first size, and wherein the intermediate image has a second size greater than or equal to the first size.

11. The system of claim 10, wherein the second size is consistent with a 16 mm, 35 mm, or 70 mm film format.

12. The system of claim 10, wherein the projection subsystem is further configured to correct for film buckle effects.

13. The system of claim 1, wherein the projection subsystem is further configured to correct for film buckle effects, and wherein the speckle reduction element has a curved surface configured at least to compensate for the projection subsystem's correction of film buckle effects.

14. The system of claim 13, wherein the curved surface is a surface through which the intermediate image is received.

15. The system of claim 13, wherein the curved surface is a surface through which the intermediate image exits the speckle reduction element.

16. The system of claim 1, wherein the relay system has a first f-number, and the projection subsystem has a second f-number less than the first f-number.

17. The system of claim 16, wherein the second f-number is at least half the first f-number.

18. The system of claim 1, wherein the relay system has a first working distance, and the projection subsystem has a second working distance less than the first working distance.

19. The system of claim 18, wherein the second working distance is at least half the first working distance.

20. A method of projecting light comprising: generating coherent light from a coherent light source system; forming an image with an image forming system at least by interacting with the coherent light in a manner consistent with image data; forming an intermediate image at an intermediate image plane at least from coherent light output from the image forming system, the intermediate image being an aerial real image formed with a relay system; transferring the intermediate image through a speckle reduction element located at or substantially at the intermediate image plane; projecting the intermediate image, as transferred through the speckle reduction element with a projection subsystem, and moving the speckle reduction element with a movement generating system both in a direction parallel to an optical axis of the projection subsystem and in a direction perpendicular to the optical axis of the projection subsystem, wherein the motion of the speckle reduction element in the direction parallel to the optical axis remains within a depth of focus of the relay system and the projection subsystem, the moving occurring while the intermediate image is transferred through the speckle reduction element.

21. The system of claim 7, wherein the sparsely distributed lenslets have gaps between the lenslets that are greater than or equal to the size of an image pixel of the intermediate image at the intermediate image plane.

* * * * *